United States Patent
Rief et al.

(10) Patent No.: US 8,678,026 B2
(45) Date of Patent: Mar. 25, 2014

(54) AUTOMATIC INCREASED-SUCTION RELIEF APPARATUS

(76) Inventors: Dieter J. Rief, Santa Rosa, CA (US);
Hans Schlitzer, Rohnert Park, CA (US);
Manuela Rief, Santa Rosa, CA (US)

( * ) Notice: Subject to any disclaimer, the term of this patent is extended or adjusted under 35 U.S.C. 154(b) by 752 days.

(21) Appl. No.: 12/565,902

(22) Filed: Sep. 24, 2009

(65) Prior Publication Data

US 2011/0068285 A1    Mar. 24, 2011

(51) Int. Cl.
*G05D 11/02* (2006.01)
*F16K 11/02* (2006.01)
*F16K 17/00* (2006.01)
*F16K 25/00* (2006.01)
*F04B 49/02* (2006.01)

(52) U.S. Cl.
USPC .......... 137/112; 137/239; 137/463; 137/907; 251/192; 417/26

(58) Field of Classification Search
USPC ......... 137/239, 240, 112, 113, 463, 557, 907, 137/456, 556.3, 119.06, 215, 217, 218, 137/111; 251/192, 203; 417/20, 26, 44.1, 417/44.2
See application file for complete search history.

(56) References Cited

U.S. PATENT DOCUMENTS

| | | | | |
|---|---|---|---|---|
| 1,296,922 A * | 3/1919 | Clairmont | ..................... | 137/240 |
| 1,383,231 A * | 6/1921 | Nelson | ......................... | 137/555 |
| 1,724,389 A * | 8/1929 | Abel | ............................. | 137/463 |
| 1,877,221 A * | 9/1932 | Brown et al. | ................... | 251/73 |
| 2,485,008 A * | 10/1949 | Morris | ........................... | 285/97 |
| 4,470,429 A | 9/1984 | Johnson | | |
| 4,570,660 A | 2/1986 | Chauvier | | |
| 4,844,115 A * | 7/1989 | Bowers | ......................... | 137/240 |
| 5,178,684 A * | 1/1993 | Hutchins, Sr. | ............. | 134/22.11 |
| 5,305,988 A * | 4/1994 | Cox | .............................. | 251/309 |
| 5,735,461 A * | 4/1998 | Winther | ....................... | 239/124 |
| 6,059,536 A | 5/2000 | Stingl | | |
| 6,068,023 A * | 5/2000 | Potter | ...................... | 137/625.47 |
| 6,289,918 B1 | 9/2001 | Rief et al. | | |

(Continued)

OTHER PUBLICATIONS

Excerpts of PCT International Search Report and Written Opinion for PCT/US2010/002358. 4 pages. Date: Oct. 28, 2010.

*Primary Examiner* — Craig Schneider
*Assistant Examiner* — Jonathan Waddy
(74) *Attorney, Agent, or Firm* — Jansson Munger McKinley & Shape Ltd.

(57) ABSTRACT

An automatic vacuum-relief apparatus for liquid suction systems includes a vessel defining a chamber filled with liquid in communication with a liquid flow line, a rotary shaft extending through the chamber to support a valve device adjacent to the liquid flow line and to move the valve device to open a relief-air flow channel to relieve increased suction caused by inlet blockage, and a piston on the rotary shaft responsive to suction increases within the liquid flow line and chamber to actuate shaft rotation. The valve device, chamber and relief-air flow channel are configured and arranged to cause a spurt of liquid from the chamber into the inlet while the valve device is moving from its isolating position toward its opening position upon inlet blockage, whereby the spurt of liquid pushes the blockage away from the inlet and the relief air reduces the suction. The valve includes a liquid-flow barrier secured with respect to the liquid flow line such that the barrier is in an open position allowing flow of liquid from the inlet to the outlet during normal operation and in a closed position isolating the inlet from the outlet in response to suction increases upon inlet blockage.

26 Claims, 11 Drawing Sheets

(56) References Cited

U.S. PATENT DOCUMENTS

| | | |
|---|---|---|
| 6,393,628 B1 | 5/2002 | Kellogg |
| 6,460,564 B1 | 10/2002 | Rief et al. |
| 6,485,000 B1 | 11/2002 | Klyde et al. |
| 6,591,863 B2 | 7/2003 | Ruschell et al. |
| 6,779,205 B2 | 8/2004 | Mulvey et al. |
| 6,997,135 B1 * | 2/2006 | DeWaard .................. 119/14.44 |
| 2006/0238039 A1 * | 10/2006 | Niedermeyer et al. ..... 310/49 R |

* cited by examiner

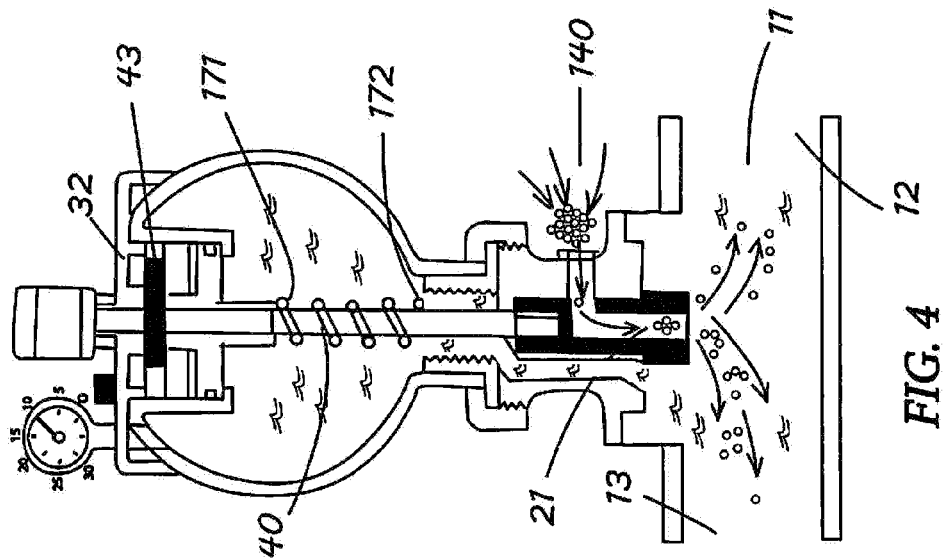
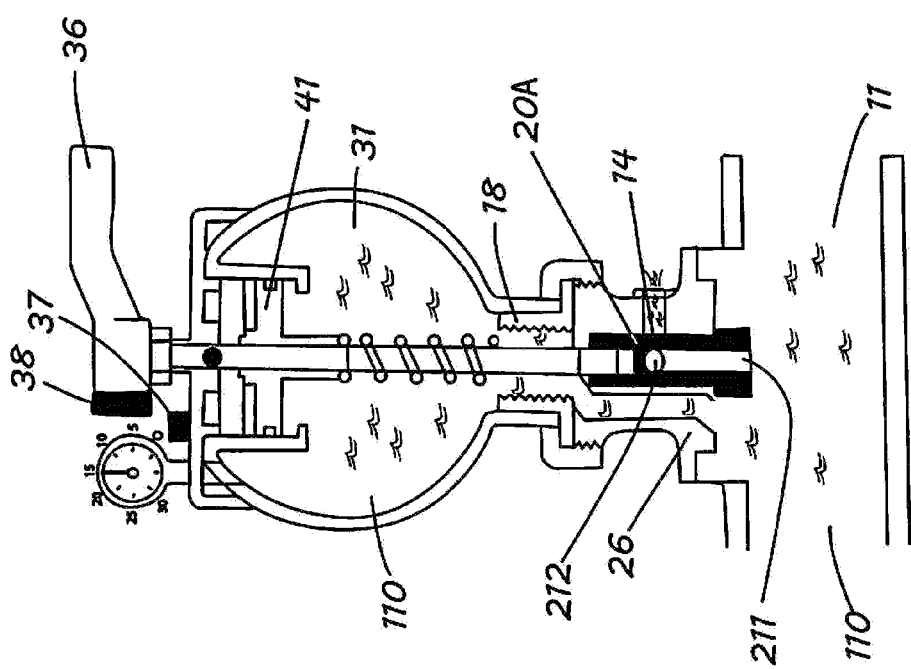
FIG. 3
FIG. 4

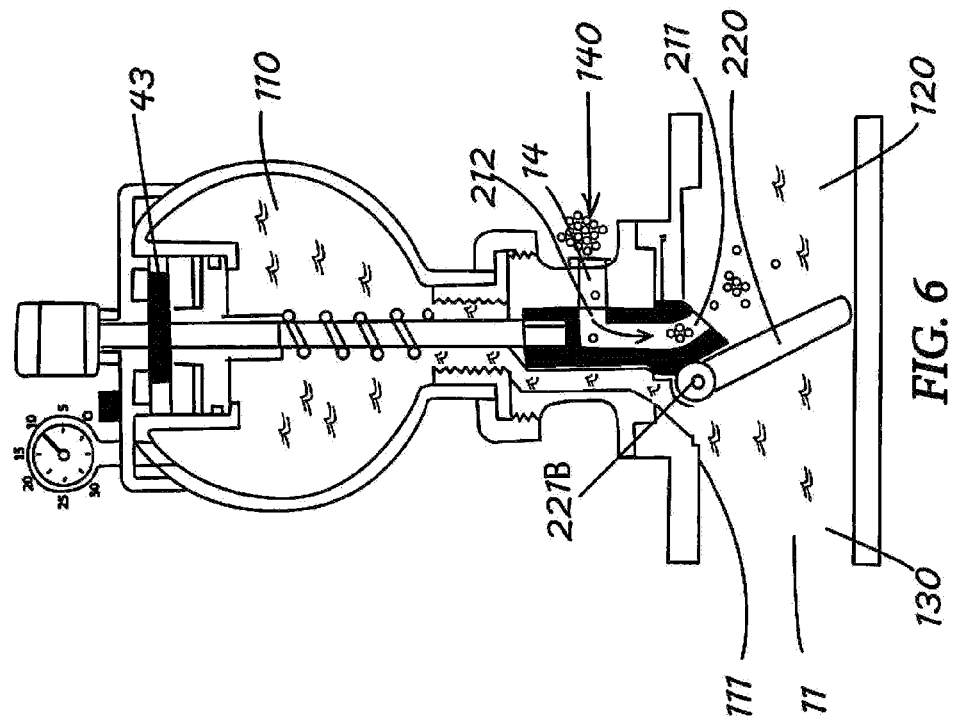
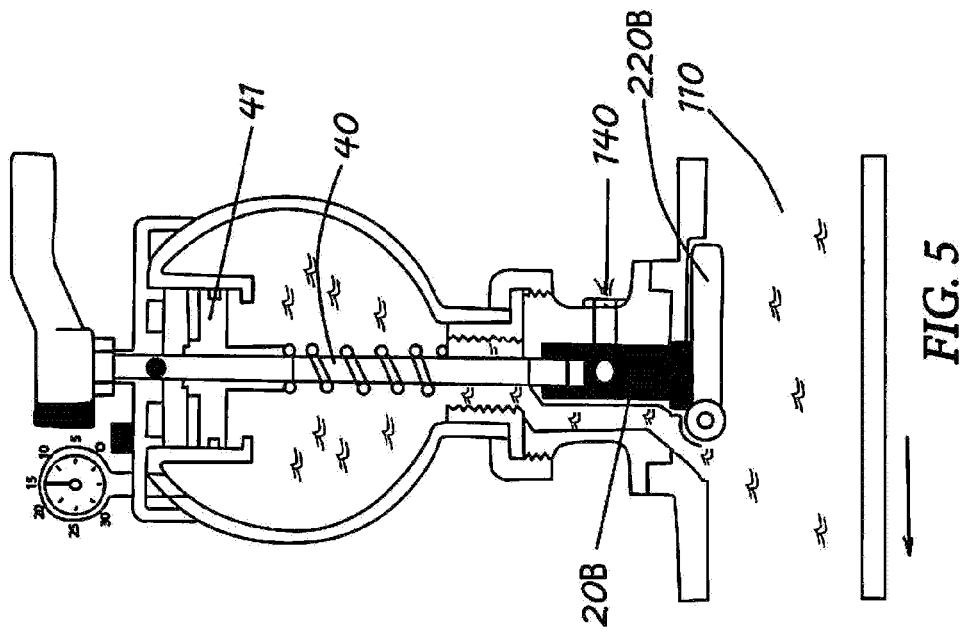
FIG. 6
FIG. 5

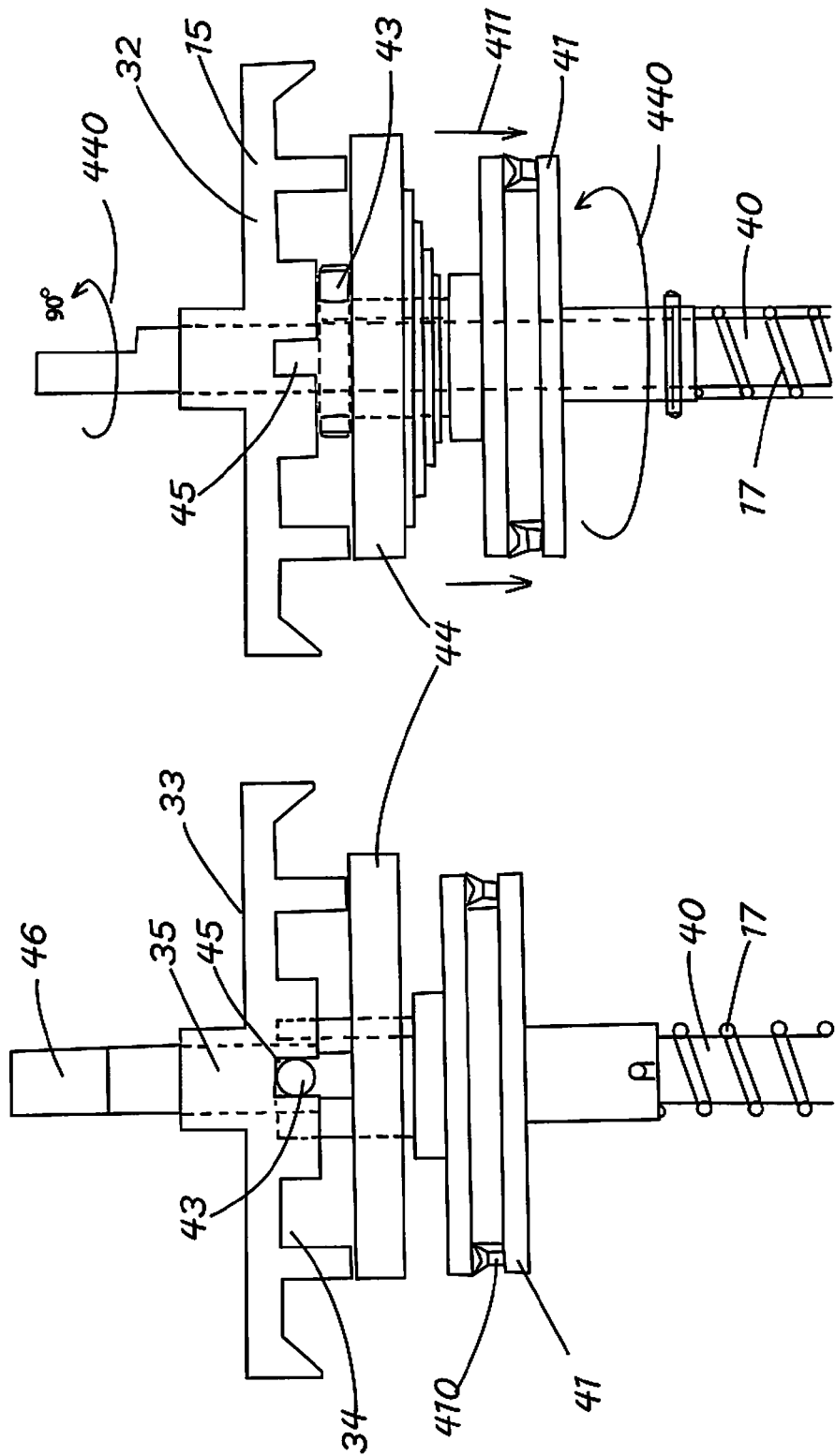

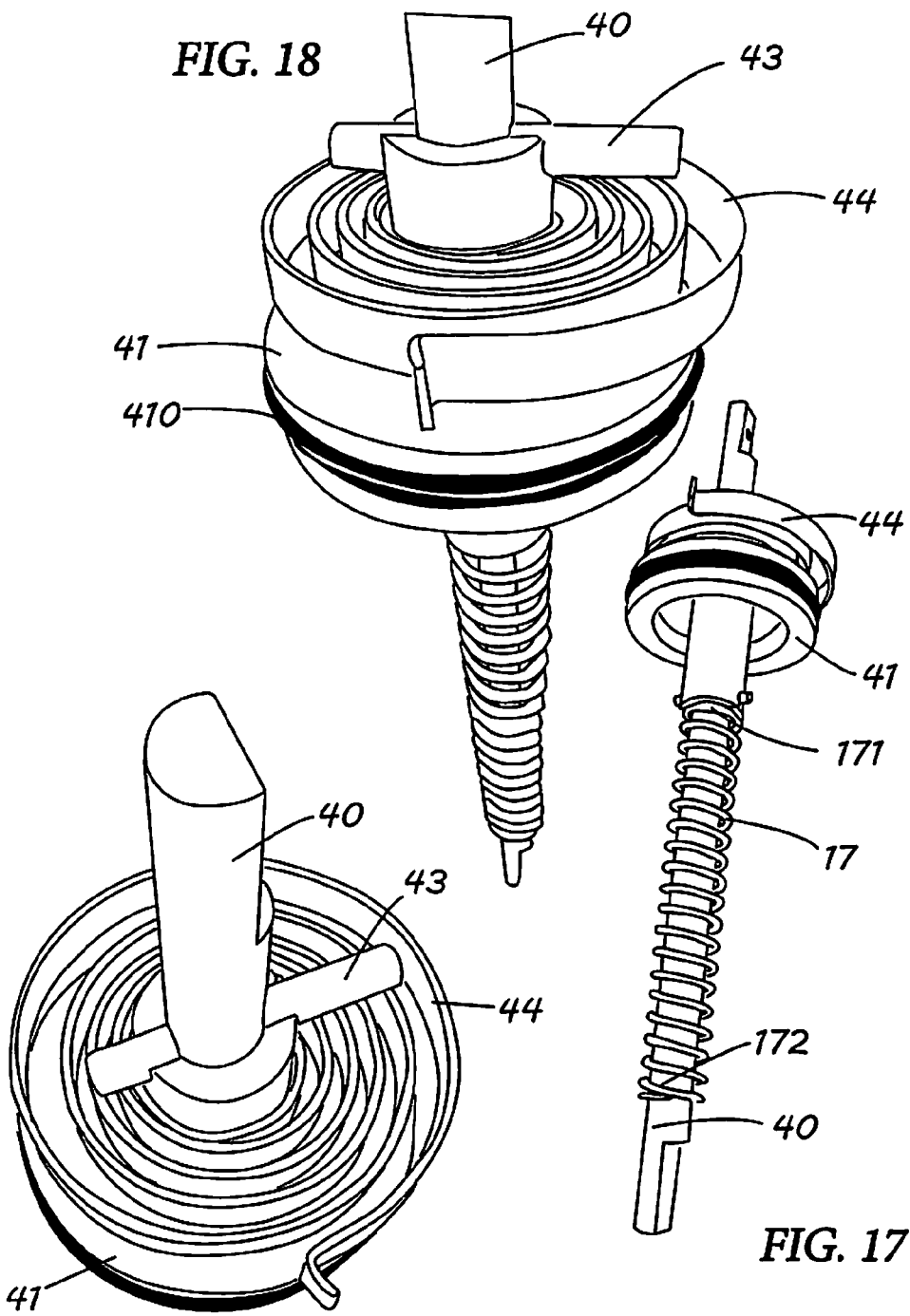

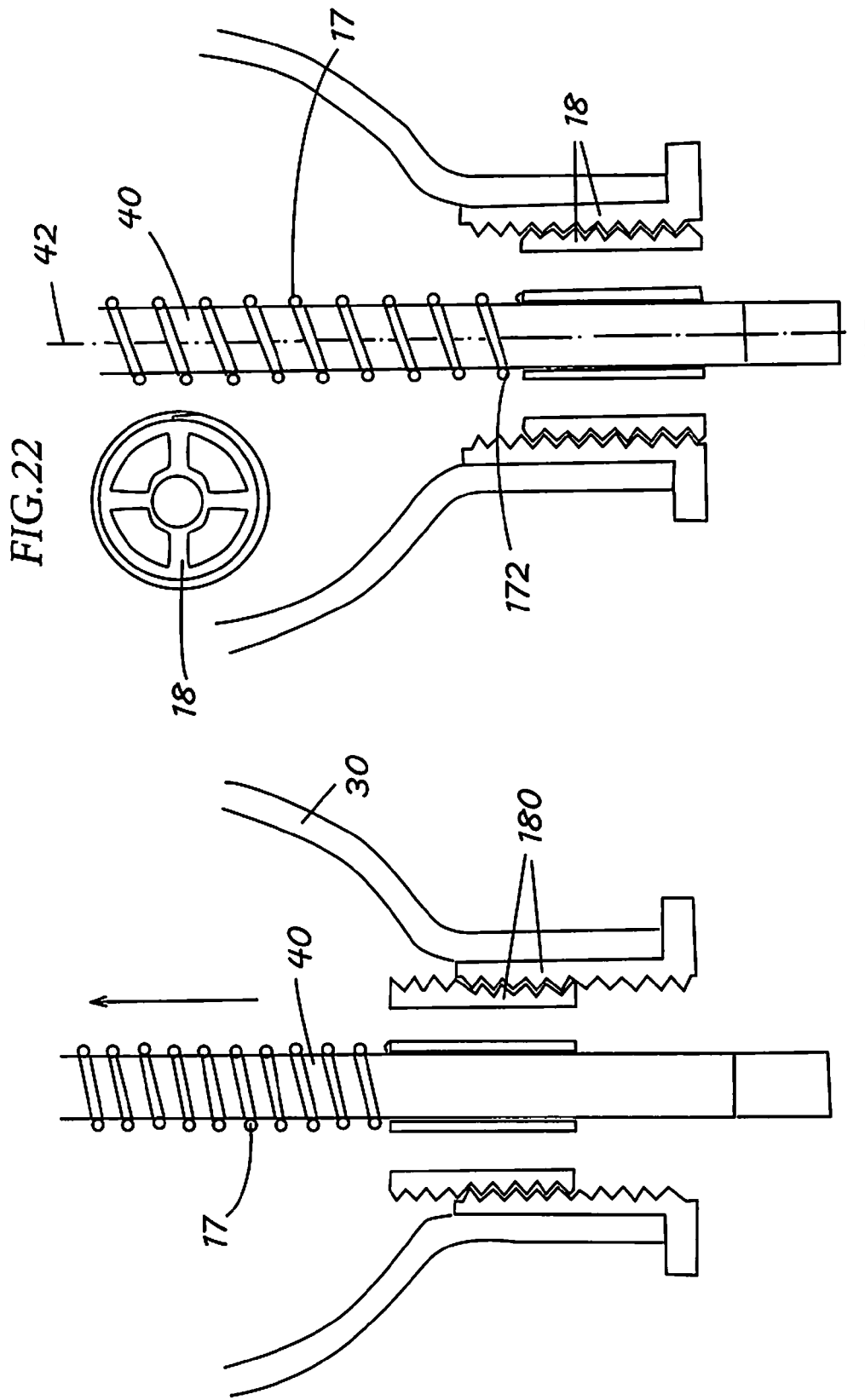

AUTOMATIC INCREASED-SUCTION RELIEF APPARATUS

FIELD OF THE INVENTION

This invention relates generally to emergency relieve valves for liquid suction systems and, more particularly, to increased-suction relieve valves for water suction systems for swimming pools, spas and the like. Still more particularly, this invention relates to rotary valves for suction cleaning systems for swimming pools, spas and the like.

BACKGROUND OF THE INVENTION

Liquid suction systems are employed in a variety of settings and for a variety of purposes. One example is the liquid suction systems which are used for swimming pools, spas and the like. Such system typically includes a suction pump away from the pool for drawing water from the pool at one or more suction ports located along the pool sidewall and/or through the main drain of the pool. A hose is typically connected to one of the sidewall ports and extends to an automatic swimming pool cleaner which draws pool water for cleaning purposes.

Typically, one or more valve mechanisms are used to determine whether water will be sucked from the pool through the main drain and/or through the side port(s). One example of such valve mechanisms is the three-way rotary-plug valve disclosed in U.S. Pat. No. 4,470,429 (Johnson). Such device is a manually-operated rotary-plug valve.

Valve mechanisms of the prior art for controlling which lines will be open to vacuum forces, such as the rotary-plug valve of the aforementioned Johnson patent, have various shortcomings. Among these are the fact that they require manual operation, and thus fail to address problems associated with unexpected line clogging or blockage. Also, even when operated manually such devices fail to provide any vacuum relief in a line which has been manually shut off because of line blockage. In such cases, it may become necessary to turn off the pump and reopen the line in order to relieve the vacuum force remaining in the line. Furthermore, while such devices can be locked into a predetermined position, such locking requires an additional manual step, beyond merely closing a line.

In swimming pool suction systems, when suction lines become obstructed with debris, damage to the lines and equipment may result if excessive vacuum pressures are not quickly released. Furthermore, a risk of bodily injury may exist if a vacuum or suction device comes into contact with a person. Various bypass devices have been developed to address problems of excessive vacuum due to blockage. One example is the device disclosed in U.S. Pat. No. 4,570,660 (Chauvier).

Our U.S. Pat. Nos. 6,460,564 (Rief et al.) and 6,289,918 (Rief et al.) disclose improvements in such valves. More specifically, these patents disclose automatic valves. The present invention is a further improvement in automatic rotary valves which overcomes many problems and shortcomings of the prior art.

OBJECTS OF THE INVENTION

It is an object of the present invention to provide an improved vacuum-relief apparatus overcoming some of the problems and shortcomings of the prior art, including those referred to above.

Another object of the invention is to provide a relief of vacuum and an increased suction caused by inlet blockage.

Another object of this invention is to provide an improved vacuum-relief apparatus which can operate automatically, i.e., which automatically provides an increased-suction relief when vacuum pressure in the liquid flow line exceeds a predetermined acceptable range of vacuum pressures.

Another object of this invention is to provide an improved vacuum-relief apparatus which automatically locks in a shut-off position in response to unacceptable line pressures.

Another object of the invention is to provide an improved vacuum-relief apparatus which automatically relieves the vacuum pressure in a closed line after such line has been shut off.

Yet another object of the invention is to provide an improved vacuum-relief apparatus which shuts off a flow line due to unacceptable vacuum pressure caused by inlet blockage and simultaneously relieves the unacceptable vacuum pressure in the line upon line shut-off.

Another object of the invention is to provide an improved vacuum-relief apparatus with a single valve providing both an automatic liquid flow-line shut-off and the vacuum relief.

Another object of the invention is to provide an improved vacuum-relief apparatus which, although it automatically shuts off a line and automatically relieves line pressure, has a override for manual operation and resetting.

Still another object of this invention is to provide an improved vacuum-relief apparatus which allows customization to accommodate particular suction-system parameters.

Another object of the invention is to provide an improved vacuum-relief apparatus which automatically provides a force rebuffing the blockage away from the inlet.

Yet another object of the invention is to provide an improved vacuum-relief apparatus which is simple in construction and easily maintained.

How these and other objects are accomplished will become apparent from the following descriptions and the drawings.

SUMMARY OF THE INVENTION

This invention is an automatic vacuum-relief apparatus for liquid suction systems. More specifically, this invention is an automatic vacuum-relief apparatus of the type including a liquid flow line with an inlet and an outlet, a relief-air flow channel which communicates with the liquid flow line upon inlet blockage, and a valve device isolating the relief-air flow channel from the liquid flow line during normal operation and opening the relief-air flow channel to the liquid flow line upon inlet blockage.

The inventive automatic vacuum-relief apparatus includes a vessel defining a chamber which is filled with liquid in communication with the liquid flow line. The vessel is open to the liquid flow line such that the liquid buffers suction serges which occur when a suction pump is first turned on. A rotary shaft extends through the chamber to support the valve device adjacent to the liquid flow line and to move the valve device to open the relief-air flow channel for relieving increased suction caused by inlet blockage. A piston on the rotary shaft is responsive to suction increases within the liquid flow line and chamber and actuates shaft rotation. The valve device, chamber and relief-air flow channel are configured and arranged to cause a spurt of liquid from the chamber into the inlet while the valve device is moving from its isolating position toward its opening position upon inlet blockage. Such spurt of liquid pushes the blockage away from the inlet and the relief air reduces the suction.

The term "spurt," as used with respect to the fluid movement toward the inlet, means a gush or a sudden strong stream of liquid rushing out of the liquid flow line toward the inlet. Such sudden gush of liquid coming out of the inlet pushes the blockage away from the inlet.

It should be understood that, while this application primarily refers to liquid systems such as swimming pools and similar systems operating with water, the present invention may be applicable for other suction systems, including those operating with oils and other liquids.

The inventive automatic vacuum-relief apparatus preferably includes a support structure attached to the vessel. The piston responsive to suction increases is preferably slidably supported in the support structure. A restrictor is preferably affixed to the rotary shaft. It is further preferred that a clock spring be connected to the rotary shaft and bias the shaft in a rotational direction. The support structure preferably has a retainer engaging the restrictor and restraining it in a fixed rotational position during normal operation. When the restrictor is disengaged from the retainer by the piston movement in response to a suction increase, the clock spring rotates the shaft.

Preferred embodiments of the inventive automatic vacuum-relief apparatus include a compression spring about the shaft. The compression spring axially biases the piston and shaft toward the support structure to maintain the engagement of the restrictor with the retainer. The compression spring preferably has a first end near the piston and a second end against a spring support which is axially-adjustable with respect to the vessel. The axial adjustability of the spring support allows adjustment of the spring pressure against the piston to correspond the suction increase necessary to displace the piston and disengage the restrictor from the retainer upon inlet blockage.

The support structure preferably includes a cover member with outer and inner sides. The retainer may be a trans-axial recess in the inner side shaped to accept the restrictor in the trans-axial recess during normal operation.

In preferred embodiments, the shaft has a distal portion. The cover member preferably defines an aperture through which the shaft extends to its distal portion. It is preferred that a handle is affixed to the shaft distal portion to facilitate resetting the device after clearing inlet blockage. A normal-operation indicator is preferably positioned on the cover-member outer side. The handle preferably includes a marker aligned with the indicator during normal operation and spaced therefrom by shaft rotation actuated by inlet-blockage.

In highly preferred embodiments of the inventive automatic vacuum-relief apparatus, the valve device defines an air passage having a first and second ends. The first end is in communication with the liquid-flow line. The second end is closed during normal operation and is open to the air-flow channel by rotation of the shaft responsive to suction increases upon inlet blockage, thereby reducing the suction by bleeding air into the liquid-flow channel.

In some of the highly preferred embodiments, the valve also includes a liquid-flow barrier secured with respect to the liquid flow line. During normal operation, the barrier is in an open position allowing flow of liquid from the inlet to the outlet. In response to suction increases, the barrier is moved to a closed position isolating the inlet from the outlet in response to suction increases upon inlet blockage.

It is preferred that the first end of the air passage be on the inlet side of the closed barrier, thereby bleeding air toward the blocked inlet to relieve increased suction and facilitate removal of the blockage from the inlet.

The liquid-flow barrier is preferably a door member extending substantially parallel to the liquid flow line in its open position and across the liquid flow line in its closed position.

In some embodiments, the valve device may be configured to support the door member in its open position during normal operation such that the valve rotation by the shaft in response to the suction increases upon inlet blockage releases the door member for pivoting into its closed position across the liquid flow line.

The door member may pivot about an axis located across the edge of the liquid flow line. Alternatively, the door member may be configured to pivot about an axis intersecting the middle of the liquid flow line. The door member may be a body having a passageway therethrough for flow of liquid from the inlet to the outlet during normal operation.

In some preferred embodiments, the barrier moves with respect to an opening-closing axis and has a closing edge extending progressively closer to the opening-closing axis in a closing-forward direction. The valve device preferably includes a sealing member sealingly engaging the barrier closing edge in the barrier closed position and extending progressively closer to the barrier opening-closing axis in a barrier closing-forward direction. The barrier preferably pivots across the liquid flow line when the valve is rotated by the shaft in response to the suction increases upon inlet blockage.

Preferred embodiments of the inventive automatic vacuum-relief apparatus further include a limit switch attached to the support structure in position for actuation by the shaft movement, whereby the electric motor of the suction system is disabled upon inlet blockage.

BRIEF DESCRIPTION OF THE DRAWINGS

FIG. 3 is a cross-sectional view of another embodiment of the inventive automatic vacuum-relief apparatus during normal operation of the liquid suction system.

FIG. 4 is a cross-sectional view of the embodiment of FIG. 3 shown activated by increased suction caused by inlet blockage, a valve device opening a relief-air flow line to the liquid flow line.

FIG. 5 is a cross-sectional view of yet another embodiment of the inventive automatic vacuum-relief apparatus during normal operation of the liquid suction system.

FIG. 6 is a cross-sectional view of the embodiment of FIG. 5 shown activated by increased suction caused by inlet blockage, a valve device isolating liquid flow-line inlet from outlet and opening a relief-air flow line to the inlet side of the liquid flow line.

FIG. 15 is a side elevation of a fragment of a piston arrangement on a rotary shaft during normal operation of the liquid suction system.

FIG. 16 is a side elevation of a fragment of a piston arrangement on a rotary shaft activated by increased suction caused by inlet blockage.

FIG. 17 is a perspective view of the rotary shaft supporting a compression spring, the piston and a clock spring.

FIG. 18 is another perspective view showing the arrangement of FIG. 17 from an opposite direction.

FIG. 19 is a perspective view of a clock spring-piston arrangement on the rotary shaft.

FIG. 20 is a fragmental cross-sectional view showing axial adjustment of the compression spring to customize for a particular liquid-suction system, the spring tension being increased.

FIG. 21 is a fragmental cross-sectional view similar to FIG. 20, but with the spring tension being decreased.

FIG. 22 is a top plan view of an axially-adjustable spring support of FIGS. 20 and 21.

DETAILED DESCRIPTION OF PREFERRED EMBODIMENTS

Figure 1:
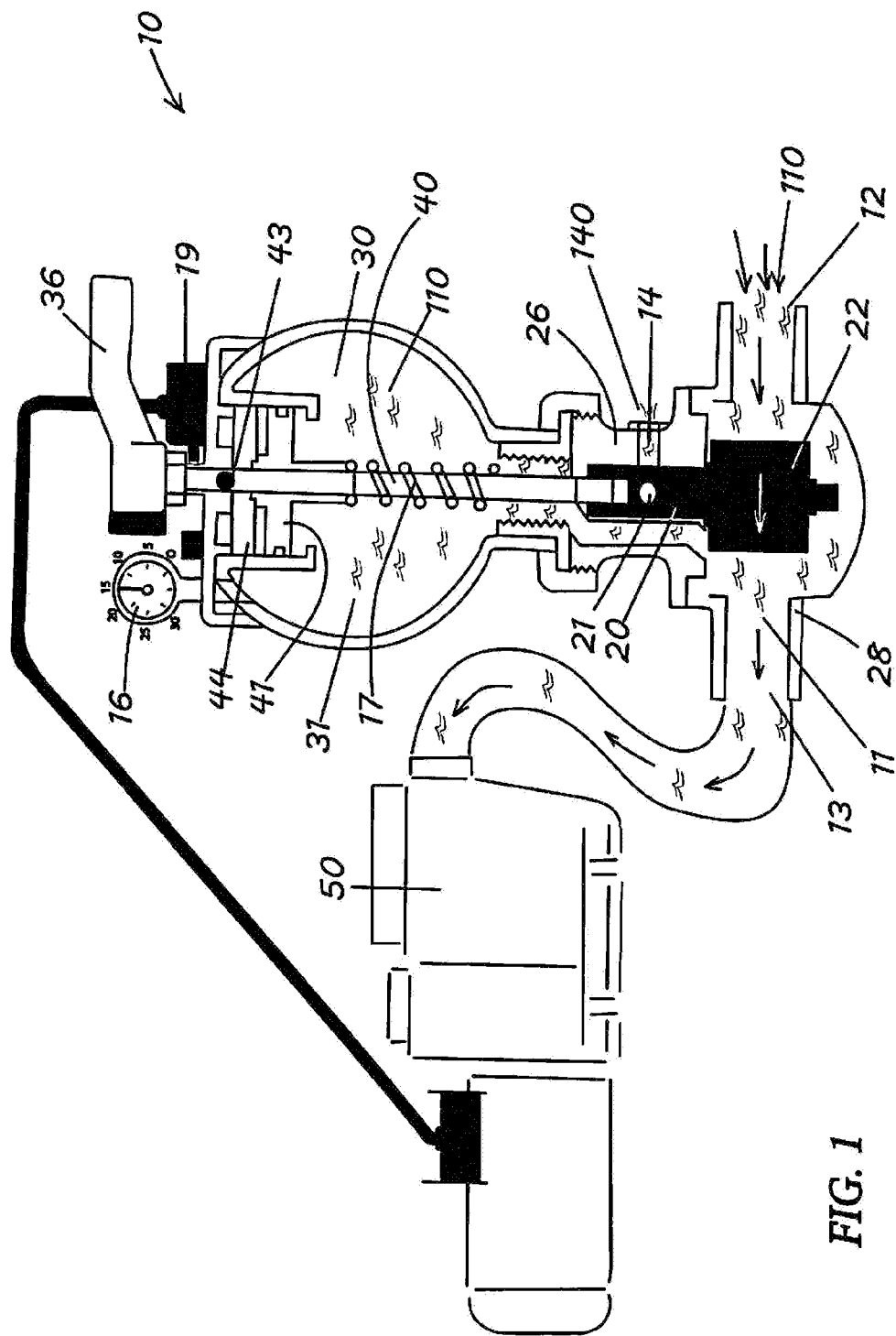
FIG. 1 is a cross-sectional view of one embodiment of the inventive automatic vacuum-relief apparatus during normal operation of a liquid suction system.

FIGS. 1-22 illustrate an improvement in an automatic vacuum-relief apparatus 10 for liquid suction systems. Automatic vacuum-relief apparatus 10 is of the type including a liquid flow line 11 with an inlet 12 and an outlet 13, a relief-air flow channel 14 which communicates with liquid flow line 11 upon inlet blockage, and a valve device 20 isolating relief-air flow channel 14 from liquid flow line 11 during normal operation and opening relief-air flow channel 14 to liquid flow line 11 upon inlet blockage.

FIGS. 1-10 show that automatic vacuum-relief apparatus 10 includes a vessel 30 defining a chamber 31 which is filled with liquid 110 in communication with liquid flow line 11. Vessel 30 is open to liquid flow line 11 such that liquid 110 buffers suction serges which occur when a suction pump 50 is first turned on. A rotary shaft 40 extends through chamber 31 to support valve device 20 adjacent to liquid flow line 11 and to move valve device 20 to open relief-air flow channel 14 to relieve increased suction caused by inlet blockage. A piston 41 on rotary shaft 40 is responsive to suction increases within liquid flow line 11 and chamber 31 to actuate rotation of shaft 40. Valve device 20, chamber 31 and relief-air flow channel 14 are configured and arranged to cause a spurt of liquid 110 from chamber 31 into inlet 12 while valve device 20 is moving from its isolating position toward its opening position upon inlet blockage. Such spurt of liquid pushes the blockage away from inlet 12 and relief air 140 reduces the increased suction caused by inlet blockage.

FIGS. 1-10 show valve 20 positioned within a valve-mounting head 26. A union nut 27 secures valve-mounting head with respect to vessel 30.

FIGS. 1-10 show that inventive automatic vacuum-relief apparatus 10 further includes a support structure 15 attached to vessel 30. Piston 41 responsive to suction increases is slidably supported in support structure 15. Piston 41 includes a hydraulic seal 410 preventing access of liquid 110 into support structure 15 beyond piston 41. A restrictor 43 is affixed to rotary shaft 40. A pre-loaded clock spring 44 is connected to rotary shaft 40 and biases shaft 40 in a rotational direction 440 (see FIGS. 15-19). Support structure 15 has a retainer 45 engaging restrictor 43. During normal operation shown in FIGS. 1, 3, 5, 7, 9 and 15, retainer 45 restrains restrictor 43 it in a fixed rotational position against rotational biasing by clock spring 44.

Automatic vacuum relief apparatus 10 includes a gauge 16 shown in FIGS. 1-10 as positioned on support structure 15. Gauge 16 is set with a value defining a limit of a normal-operation suction level. FIGS. 2, 4, 6, 8 and 10 show gauge 16 set for the suction limit at fifteen inches of mercury.

Apparatus 10 may also be activated by an electronic actuator which senses the suction increase upon inlet blockage.

When the suction increases above the set limit hydraulic piston 41 is pulled in a direction away from restrictor 43. FIG. 16 shows how restrictor 43 disengaged from retainer 45 by the piston movement 411 in response to a suction increase. This releases clock-spring 44 for rotational bias 440 which turns rotational shaft 40 for about 90°.

Automatic vacuum-relief apparatus 10 further includes a compression spring 17 about rotary shaft 40. Compression spring 17 axially biases piston 41 and shaft 40 toward support structure 15 to maintain engagement of restrictor 43 with retainer 45. Compression spring 17 has a first end 171 near piston 41, as best seen in FIG. 17, and a second end 172 against a compression-spring support 18, also shown in FIG. 22. FIGS. 20 and 21 best illustrate that compression-spring support 18 is axially-adjustable with respect to piston 41 along rotary-shaft longitudinal axis 42. Compression-spring support 18 includes a threaded bushing 180 allowing rotational adjustment of support 18 along shaft 40. The axial adjustability of compression-spring support 18 allows adjustment of a pressure which compression spring 17 exerts against piston 41. Such pressure corresponds to the suction increase necessary to displace piston 41 and disengage restrictor 43 from retainer 45 upon inlet blockage.

FIG. 20 shows compression-spring support 18 rotated toward piston 41 to increase tension of compression spring 17 and its pressure against piston 41. FIG. 21 shows compression-spring support 18 in a position away from piston 41, thus decreasing compression-spring tension. The compression-spring tension is set according to parameters specific to a particular suction system as well as parameters of a particular pool, spa or other liquid system which is served by apparatus 10. Such parameters may vary between different suction systems with different pumps, pipe diameters, distances from pump to main drain or suction ports as well as different liquid systems. The adjustability of the tension of compression-spring 18 permits vacuum-relief apparatus 10 to be customized for a wide variety of such systems and situations.

FIGS. 1-10, 15 and 16 further show that support structure 15 includes a cover member 32 with an outer side 33 and an inner side 34. FIGS. 15 and 16 show retainer 45 as a trans-axial recess in inner side 34 which is shaped to accept restrictor 43 in such trans-axial recess during normal operation. FIGS. 18 and 19 show restrictor 43 as a substantially cylindrical elongate pin extending through rotary shaft 40.

FIGS. 15 and 16 further show that shaft 40 has a distal portion 46 and cover member 32 defines an aperture 35 through which shaft 40 extends to its distal portion 46.

FIGS. 1-10 also show a handle 36 affixed to shaft distal portion 46 to facilitate resetting apparatus 10 after clearing inlet blockage. A normal-operation indicator 37 is positioned on cover-member outer side 33. Handle 36 includes a marker 38 which is aligned with indicator 37 during normal operation and is spaced therefrom by inlet-blockage actuated shaft rotation.

As seen in FIGS. 1-10, 13 and 14, valve device 20 defines an air passage 21 having a first end 211 and a second end 212. First end 211 is in communication with liquid-flow line 11, as best seen in FIGS. 2-4, 6, 8, 10 and 14. Second end 212 is closed during normal operation and is open to relief-air flow channel 14 by rotation of shaft 40 responsive to suction increases upon inlet blockage. Air passage 21 may have a plurality of first and second ends 211 and 212 communicating between relief-air flow channel 14 and liquid flow line 11. Bleeding air 140 into liquid-flow channel 11 reduces the increased suction caused by inlet blockage. FIGS. 2, 4, 6, 8, 10 and 14 show that after rotation of shaft 40 actuated by an entrapment at inlet 12, first end 211 of air passage is directed toward inlet side 120 of liquid flow line 11. Alternatively, first ends 211 may be oriented toward both inlet side and outlet side 130 to simultaneously relieve increased suction on inlet side 120 and cause pump 50 to loose its prime and/or cause pump to be turn off by bleeding air toward outlet 13.

FIGS. 3 and 4 show valve device 20A which includes air passage 21 and terminates at air-passage first end 211. When activated by inlet blockage, valve device 20A rotates to connect second end 212 of air passage 21 with relief-air flow channel 14 to pass air 140 into liquid flow line 11. The increased suction pulls air 140 which causes pump 50 to lose its prime and relieves the increased suction in blocked liquid flow line 11. This facilitates release of the blockage from inlet 12.

FIGS. 1, 2 and 5-14 show that valve 20 also includes a liquid-flow barrier 22 secured with respect to liquid flow line 11. As seen in FIGS. 1, 5, 7, 9, 11 and 13, during normal operation, barrier 22 is in an open position allowing flow of liquid 110 from inlet 12 to outlet 13. FIGS. 2, 6, 8, 10, 12 and 14 show that barrier 22 is moved to a closed position isolating inlet 12 from outlet 13 in response to suction increases upon inlet blockage.

FIGS. 2, 6, 8, 10 and 14 further show that first end 211 of air passage 21 is on inlet side 120 of closed barrier 22 such that air 140 from air passage 21 is directed toward blocked inlet 12 to relieve increased suction and facilitate blockage removal from inlet 12.

When barrier 22 is moving into its closed orientation and air passage 21 is getting connected to relief-air flow channel 14, liquid 110 is rapidly forced in a direction opposite the suction flow. This results in a sudden gush of liquid 110 rushing out of liquid flow line 11 toward inlet 12. Such sudden spurt of liquid 110 coming out of inlet 12 pushes the blockage away from inlet 12. Therefore, inventive automatic vacuum-relief apparatus 10 is configured for a triple action by single valve 20, i.e., closing the flow of liquid 110 which stops further increase of suction from inlet 12, bleeding air 140 into inlet side 120 of the closed liquid flow line 11 to relieve the increased suction, and an unexpected but highly desirable rebuffing of the blockage from inlet 12 by the force exiting inlet 12.

FIGS. 1, 2 and 5-10 show liquid-flow barrier 22 as a door member 220 which in its open position extends substantially parallel to the flow of liquid 110 in liquid flow line 11 and in its closed position extends across liquid flow line 11.

FIG. 5 shows valve device 20B configured to support door member 220B in the door open position during normal operation. When valve 20B is rotated by shaft 40 in response to the suction increases upon inlet blockage, door member 220B pivots across liquid flow line 11, as shown in FIG. 6. In FIG. 6, door member 220B pivots about an axis 221B located across edge 111 of liquid flow line 11. Axis 221B is shown to extend substantially along edge 111 and substantially across the direction of the flow of liquid 110. In other words, rotation of valve 20B releases door member 220B for dropping down across liquid flow line 11 to isolate inlet 12 from outlet 13. It is further seen in FIG. 6 that, upon rotation of valve 20B, air passage 21B has its second end 212 connected to relief-air flow channel 14 and first end 211 oriented toward inlet 12 allowing air 140 to enter inlet side 120 of liquid flow line 11.

Figure 8:
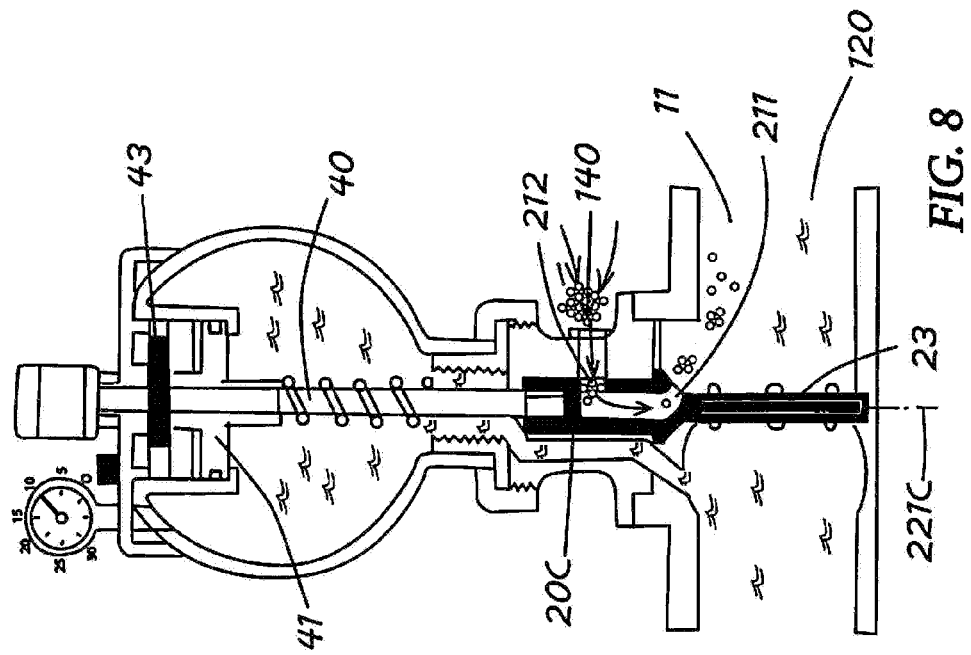
FIG. 8 is a cross-sectional view of the embodiment of FIG. 7 shown activated by increased suction caused by inlet blockage, a valve device isolating liquid flow-line inlet from outlet and opening a relief-air flow line to the inlet side of the liquid flow line.
Figure 7:
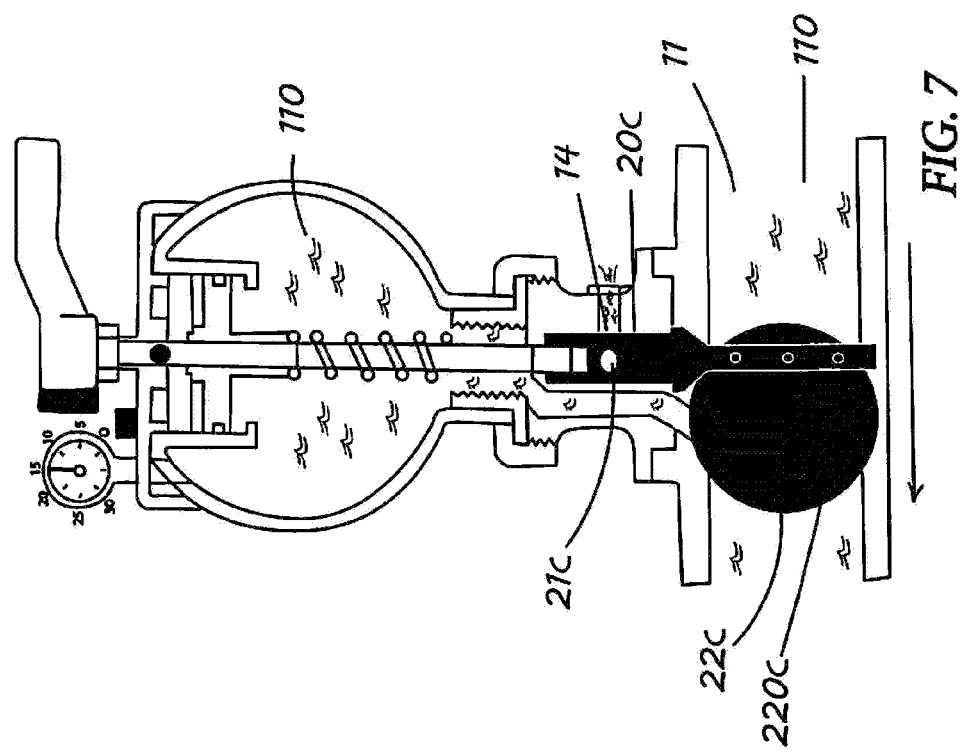
FIG. 7 is a cross-sectional view of another embodiment of the inventive automatic vacuum-relief apparatus during normal operation of the liquid suction system.

FIG. 7 shows valve device 20C during normal operation. Valve device 20C has barrier 22C as door member 220C having a substantially planar disk-like shape conforming to a cross-sectional configuration of liquid flow line 11. FIGS. 7 and 8 show that valve device 20C includes a door-mounting member 23 extending into liquid flow line 11 substantially coaxially with rotary shaft 40 and defining door-member pivot axis 221C. Door member 220C is secured to door-mounting member 23 at an off-center position. As seen in FIG. 7, during normal operation, liquid 110 flows along sides of door member 220C. When valve 20C is rotated by shaft 40 in response to the suction increases upon inlet blockage, door member 220C pivots about axis 221C across liquid flow line 11, as shown in FIG. 8. FIG. 8 further shows that, upon rotation of valve 20C, air passage 21C has its second end 212 connected to relief-air flow channel 14 and first end 211 oriented toward inlet 12 allowing air 140 to enter inlet side 120 of liquid flow line 11.

FIGS. 1, 2, 9 and 10 show valve devices 20D and 20E having door members 220D and 220E each configured to pivot about respective axes 221D and 221E each substantially coaxial with rotary shaft 40 and intersecting middle 112 of liquid flow line 11. Door members 220D and 220E are each shown as a body having a passageway 222D and 222E therethrough for flow of liquid 110 from inlet 12 to outlet 13 during normal operation.

Figure 2:
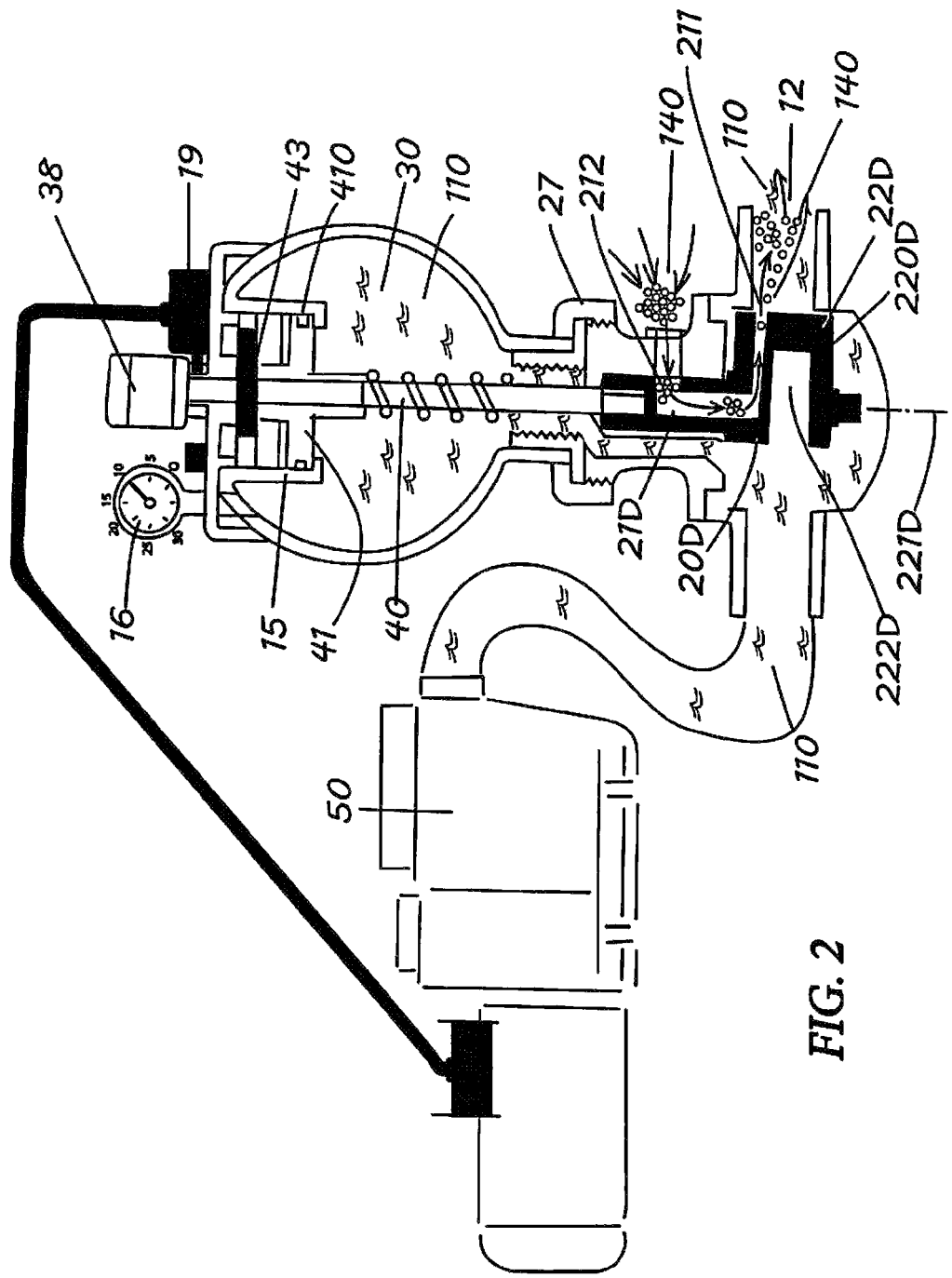
FIG. 2 is a cross-sectional view of the embodiment of FIG. 1 shown activated by increased suction caused by inlet blockage, a valve device isolating liquid flow-line inlet from outlet and opening a relief-air flow line to inlet side of the liquid flow line.

In FIGS. 1 and 2, door member 220D has a C-like shape with its open side defining passageway 222D and the closed side serving as barrier 22D to isolate inlet 12 from outlet 13. As seen in FIG. 2, the barrier 22D defines first end 211 of air passage 21D which extends through a top portion of door member 220D to second end 212. When in response to increased suction caused by inlet blockage rotary shaft 40 turns valve device 20D such that barrier 22D shuts off the flow of liquid 110 between inlet 12 and outlet 13, second end 212 connects with relief-air flow channel 14 allowing air 140 to enter liquid flow line 11 through first end 211 oriented toward inlet 12.

Figure 10:
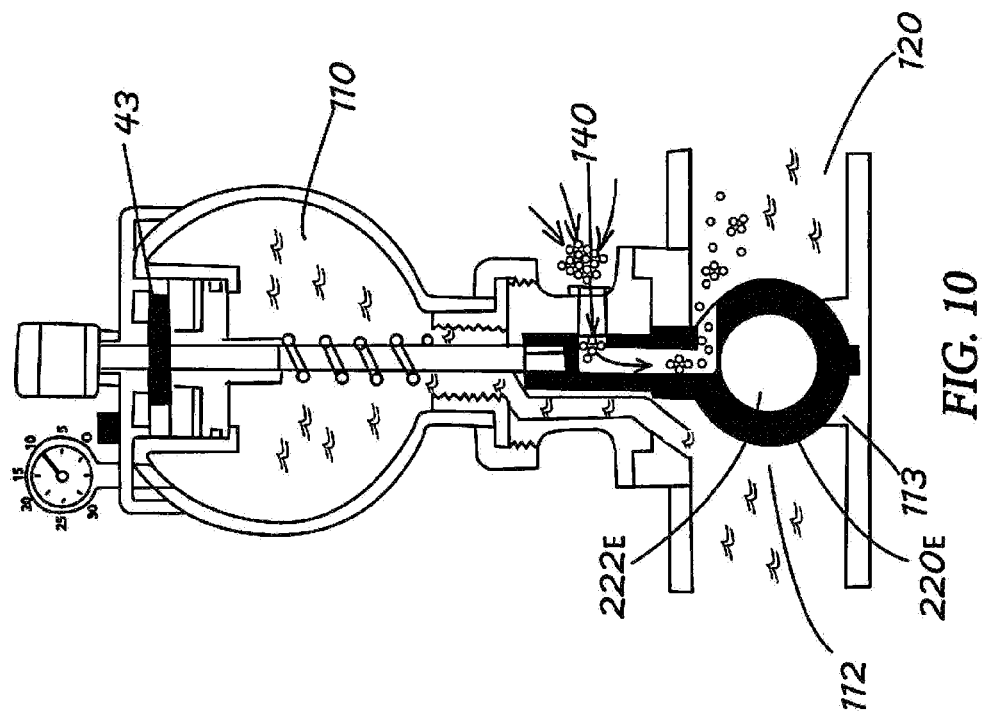
FIG. 10 is a cross-sectional view of the embodiment of FIG. 9 shown activated by increased suction caused by inlet blockage, a valve device isolating liquid flow-line inlet from outlet and opening a relief-air flow line to the inlet side of the liquid flow line.
Figure 9:
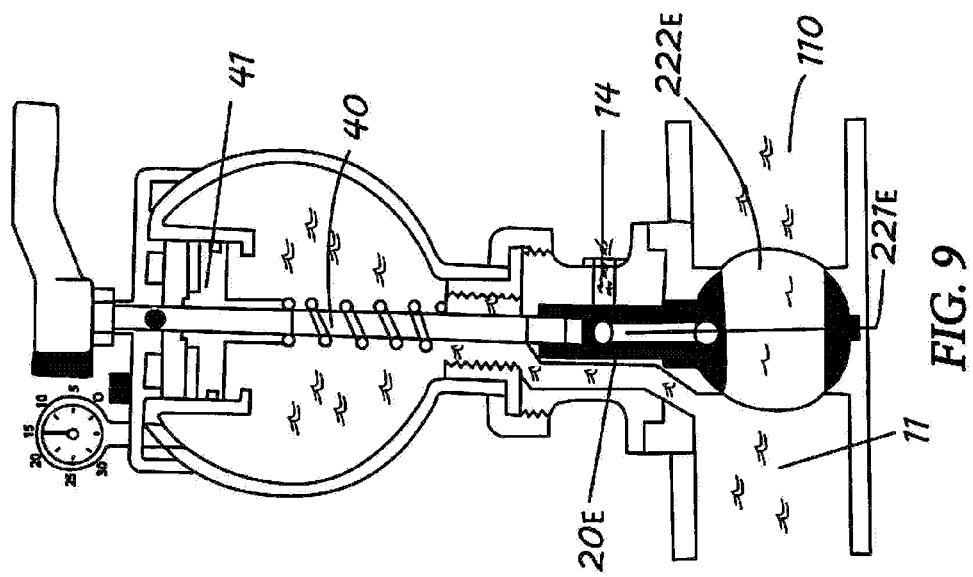
FIG. 9 is a cross-sectional view of still another embodiment of the inventive automatic vacuum-relief apparatus during normal operation of the liquid suction system.

In FIGS. 9 and 10, door member 220E defines a substantially enclosed passageway 222E which during normal operation allows flow of liquid 110 from inlet 12 to outlet 13 through door member 220E. Door member 220E is shown to have a ball shape and the liquid flow line 11 shown to form a socket 113 receiving the ball-shaped door member 220E therein Inner dimensions of socket 113 conform to outer dimensions of the ball-shaped door member 220E such that 90° rotation of door member 220E blocks the liquid flow line 11 to isolate inlet 12 from outlet 13. The rotation of door member 220E also opens relief-air flow channel 14 to inlet side 120 of liquid flow line 11 to relieve increased suction caused by inlet blockage.

Figure 11:
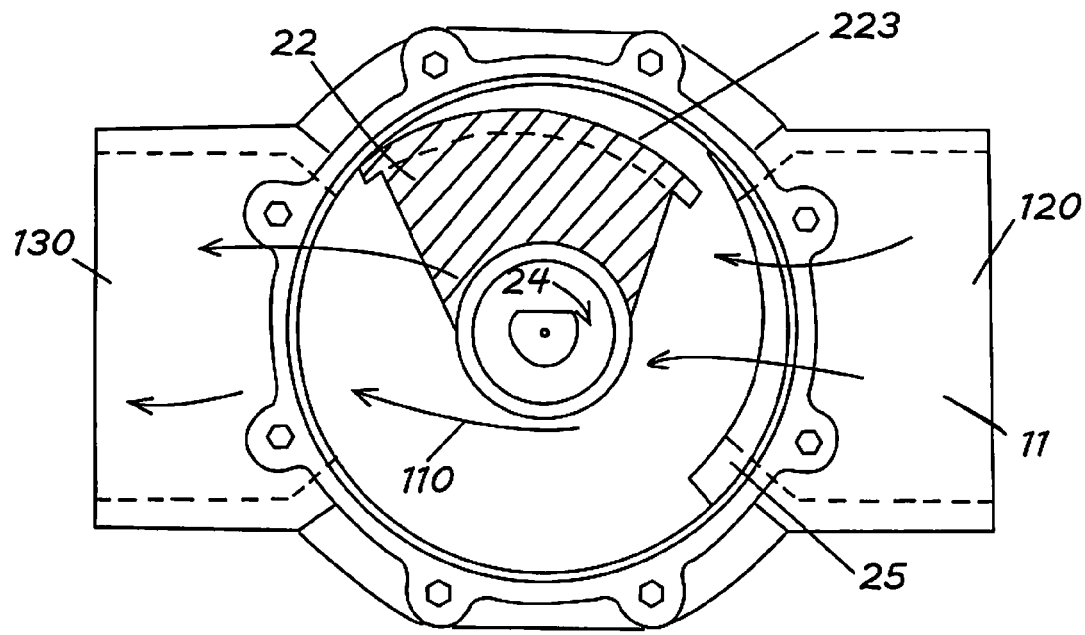
FIG. 11 is a top cross-sectional view of the inventive valve device during normal operation, the valve device including a sealing member for engagement with a barrier closing edge.
Figure 12:
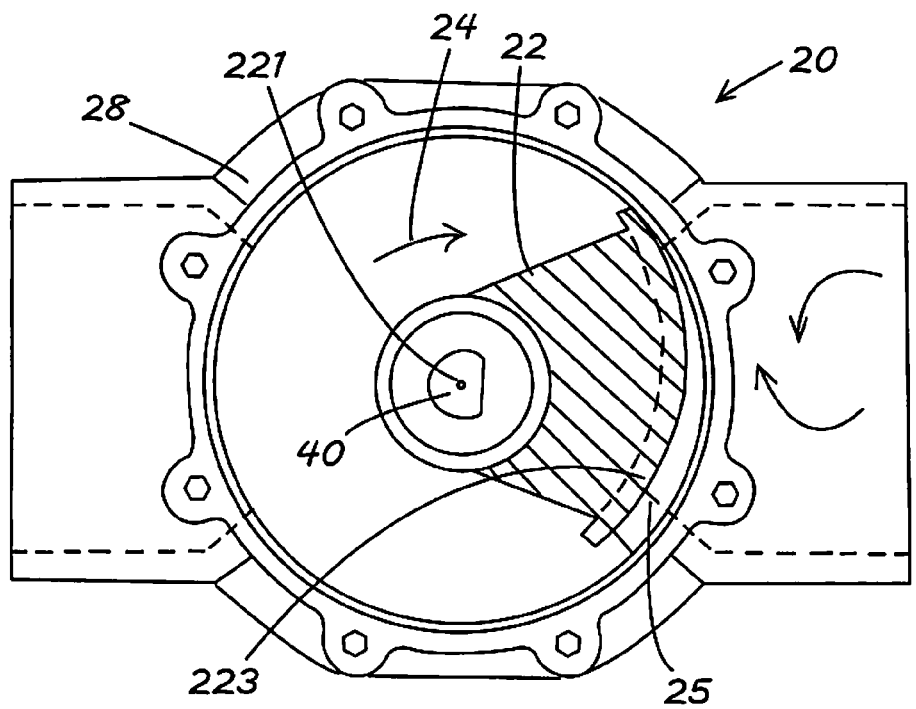
FIG. 12 is a top cross-sectional view of the valve device of FIG. 11 activated by increased suction caused by inlet blockage, the sealing member sealingly engaging the barrier closing edge.
Figure 13:
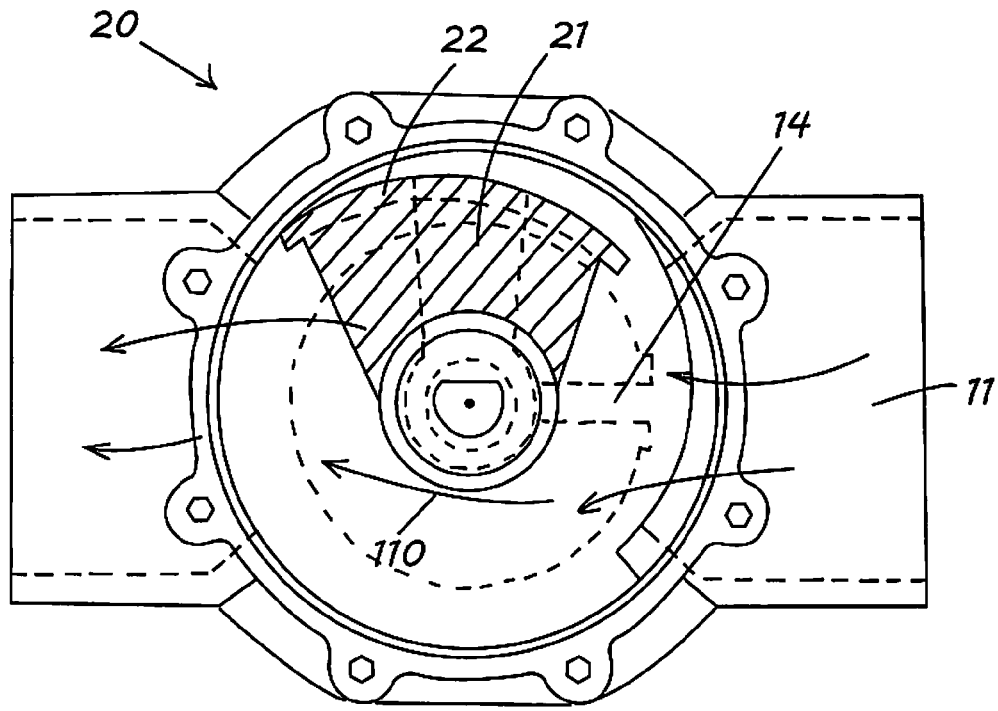
FIG. 13 is a top cross-sectional view of another embodiment of the inventive valve device as in FIG. 11, the valve device including an air passage for opening the air-flow channel to the liquid flow line.
Figure 14:
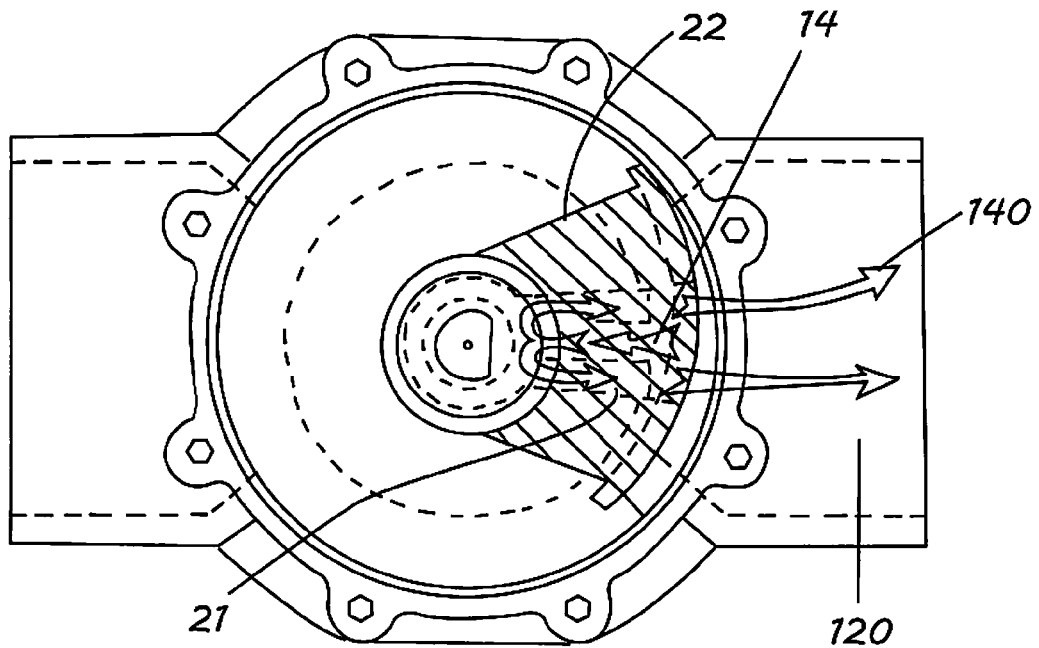
FIG. 14 is a top cross-sectional view of the valve device of FIG. 13 activated by increased suction caused by inlet blockage, the air passage opening the air-flow channel to the liquid flow line to reduce the suction by bleeding air into isolated inlet side of the liquid flow line.

FIGS. 11-14 show that barrier 22 moves with respect to an opening-closing pivot axis 221 and has a closing edge 223 extending progressively closer to opening-closing pivot axis 221 in a closing-forward direction 24. Valve device 20 includes a sealing member 25 sealingly engaging barrier closing edge 223 in the barrier closed position shown in FIGS. 12 and 14. Sealing member 25 extends progressively closer to barrier opening-closing axis 221 in barrier closing-forward direction 24. FIGS. 11 and 13 show that during normal operation barrier 22 is positioned to allow liquid 110 to flow from inlet 12 to outlet 13. FIGS. 12 and 14 show that barrier 22 pivots across liquid flow line 11 when valve 20 is rotated by shaft 40 in response to the suction increases upon inlet blockage. The configuration of barrier closing edge 223 and sealing member 25 result in an increasingly tighter seal therebetween as barrier 22 moves in closing forward direction 24. This ensures complete closure of liquid flow line 11 and isolation of inlet 12 from outlet 13.

FIGS. 13 and 14 further show valve 20 including relief-air flow channel 14 and barrier 22 including air passage 21. During normal operation of the liquid suction system, relief-air flow channel 14 is closed by barrier 22. FIG. 14 illustrates barrier 22 in its closed position such that air passage 21 connects to relief-air flow channel 14 to open flow of relief air 140 to inlet side 120 of liquid flow line 11.

Automatic vacuum-relief apparatus 10 with valve 20 may be built into an existing suction system or a new installment. FIGS. 1, 2 and 7-14 show that apparatus 10 includes a valve housing 28 configured to accommodate operation of barrier 22. Valve housing 28 may be constructed to have a two or three-way body to accommodate multi-port suction system. Apparatus 10 may be plumbed straight into plain piping via threading or clamping in any flow direction and be positioned either vertically, horizontally or at any angle. Apparatus 10 can be position both above and below fluid level.

As seen in FIGS. 1 and 2, inventive automatic vacuum-relief apparatus 10 further includes a limit switch 19 attached to support structure 15 in position for actuation by the shaft movement. Upon inlet blockage, electric motor of pump 50 can be disabled to stop suction increase in blocked liquid flow line and to prevent damage to pump 50 due to its dry operation.

While the principles of the invention have been shown and described in connection with specific embodiments, it is to be understood that such embodiments are by way of example and are not limiting.

The invention claimed is:

1. In an automatic vacuum-relief valve apparatus for liquid suction systems which includes a liquid flow line with an inlet and an outlet, and a relief-air flow channel which communicates with the liquid flow line upon inlet blockage, the relief-air flow channel being isolated from the liquid flow line during normal operation and open to the liquid flow line upon inlet blockage, the improvement comprising:

a valve device forming an air passage adjacent to the liquid flow line and allowing air into the liquid flow line in response to suction increases therein caused by inlet blockage;

a vessel defining a chamber filled with liquid in communication with the liquid flow line;

a rotary shaft extending through the chamber, one end of the shaft supporting the air-passage-forming valve device adjacent to the liquid flow line, the opposite end of the shaft; supporting a piston distal from the liquid flow line and responsive to suction increases within the chamber due to inlet blockage causing suction increases in the liquid flow line, the piston actuating rotation of the shaft thereby moving the air-passage-forming valve device from its isolating position toward its opening position in which the air passage is in communication with the relief-air flow channel to reduce the suction by bleeding air into the liquid flow line.

2. The apparatus of claim 1 further including:
a restrictor affixed to the rotary shaft;
a clock spring connected to the rotary shaft and biasing the shaft in a rotational direction; and
a support structure attached to the vessel, the piston slidably supported therein, the support structure having a retainer engaging the restrictor and restraining it in a fixed rotational position during normal operation, the clock spring rotating the shaft when the restrictor is disengaged from the retainer by the piston movement in response to a suction increase.

3. The apparatus of claim 2 further including a compression spring about the shaft and axially biasing the piston and shaft toward the support structure to maintain the engagement of the restrictor with the retainer.

4. The apparatus of claim 3 wherein the compression spring has a first end near the piston and a second end against a spring support which is axially-adjustable with respect to the vessel, thereby allowing adjustment of the spring pressure against the piston corresponding to the suction increase necessary to displace the piston and disengage the restrictor from the retainer upon inlet blockage.

5. The apparatus of claim 2 wherein:
the support structure includes a cover member with outer and inner sides; and
the retainer is a trans-axial recess in the inner side shaped to accept the restrictor therein during normal operation.

6. The apparatus of claim 5 wherein:
the shaft has a distal portion;
the cover member defines an aperture through which the shaft extends to its distal portion; and
a handle is affixed to the shaft distal portion to facilitate resetting the device after clearing inlet blockage.

7. The apparatus of claim 6 further including:
a normal-operation indicator on the cover-member outer side; and
the handle including a marker aligned with the indicator during normal operation and spaced therefrom by inlet-blockage actuated shaft rotation.

8. The apparatus of claim 1 wherein the valve device defines an air passage having (a) a first end in communication with the liquid-flow line and (b) a second end closed during normal operation and open to the air-flow channel by rotation of the shaft responsive to suction increases upon inlet blockage, thereby reducing the suction by bleeding air into the liquid-flow line.

9. The apparatus of claim 1 wherein the valve device includes a liquid-flow barrier secured with respect to the liquid flow line such that the barrier is in an open position allowing flow of liquid from the inlet to the outlet during normal operation and in a closed position isolating the inlet from the outlet in response to suction increases upon inlet blockage, thereby suddenly stopping liquid flowing in a direction away from the inlet thus causing a spurt of liquid toward the inlet to push the blockage away therefrom while the device containing the air passage is moving from its isolating position toward its opening position.

10. The apparatus of claim 9 wherein the valve device defines an air passage having (a) a first end in communication with the liquid-flow line and (b) a second end closed during normal operation and open to the air-flow channel by rotation of the shaft responsive to suction increases upon inlet blockage, thereby bleeding air into the liquid-flow channel.

11. The apparatus of claim 10 wherein the first end of the air passage is on the inlet side of the closed barrier, thereby bleeding air toward the blocked inlet to relieve increased suction and facilitate removal of the blockage from the inlet.

12. The apparatus of claim 9 wherein the barrier is a door member extending substantially parallel to the liquid flow line in its open position and across the liquid flow line in its closed position.

13. The apparatus of claim 12 wherein the valve device is configured to support the door member in its open position during normal operation such that the door member pivots across the liquid flow line when the valve device is rotated by the shaft in response to the suction increases upon inlet blockage.

14. The apparatus of claim 12 wherein the door member pivots about an axis located across the edge of the liquid flow line.

15. The apparatus of claim 12 wherein the door member pivots about an axis intersecting the middle of the liquid flow line.

16. The apparatus of claim 15 wherein the door member is a body having passageway therethrough for flow of liquid from the inlet to the outlet during normal operation.

17. The apparatus of claim 9 further including:
a support structure attached to the vessel, the piston slidably supported therein;
a restrictor affixed to the rotary shaft;
a clock spring connected to the rotary shaft and biasing the shaft in a rotational direction; and
the support structure having a retainer engaging the restrictor and restraining it in a fixed rotational position during normal operation, the clock spring rotating the shaft when the restrictor is disengaged from the retainer by the piston movement in response to a suction increase.

18. The apparatus of claim 17 further including a compression spring about the shaft and axially biasing the piston and shaft toward the support structure to maintain the engagement of the restrictor with the retainer.

19. The apparatus of claim 18 wherein the compression spring has a first end near the piston and a second end against a spring support which is axially-adjustable with respect to the vessel, thereby allowing adjustment of the spring pressure against the piston corresponding to the suction increase necessary to displace the piston and disengage the restrictor from the retainer upon inlet blockage.

20. The apparatus of claim 17 wherein:
the support structure includes a cover member with outer and inner sides; and
the retainer is a trans-axial recess in the inner side shaped to accept the restrictor therein during normal operation.

21. The apparatus of claim 20 wherein:
the shaft has a distal portion;
the cover member defines an aperture through which the shaft extends to its distal portion; and
a handle is affixed to the shaft distal portion to facilitate resetting the device after clearing inlet blockage.

22. The apparatus of claim 21 further including:
a normal-operation indicator on the cover-member outer side; and
the handle including a marker aligned with the indicator during normal operation and spaced therefrom by inlet-blockage actuated shaft rotation.

23. The apparatus of claim 9 wherein:
the barrier moves with respect to an opening-closing axis and has a closing edge extending progressively closer to the opening-closing axis in a closing-forward direction; and
the valve device includes a sealing member sealingly engaging the barrier closing edge in the barrier closed position and extending progressively closer to the barrier opening-closing axis in the barrier closing-forward direction.

24. The apparatus of claim 23 wherein the barrier pivots across the liquid flow line when the valve device is rotated by the shaft in response to the suction increases upon inlet blockage.

25. The apparatus of claim 1 further including a limit switch secured with respect to a support structure which is attached to the vessel, the limit switch being in position for actuation by the shaft movement, whereby an electric motor of the suction system is disabled upon inlet blockage.

26. The apparatus of claim 9 further including a sealing member sealingly engaging a barrier closing edge in the barrier closed position and extending progressively closer to a barrier opening-closing axis in a barrier closing-forward direction.

* * * * *